(12) United States Patent
Hernandez

(10) Patent No.: US 11,405,498 B2
(45) Date of Patent: Aug. 2, 2022

(54) AUDIOVISUAL SAFETY SYSTEM

(71) Applicant: Rosalia Hernandez, Marina, CA (US)

(72) Inventor: Rosalia Hernandez, Marina, CA (US)

( * ) Notice: Subject to any disclaimer, the term of this patent is extended or adjusted under 35 U.S.C. 154(b) by 0 days.

(21) Appl. No.: 17/184,281

(22) Filed: Feb. 24, 2021

(65) Prior Publication Data

US 2021/0266392 A1 Aug. 26, 2021

Related U.S. Application Data

(60) Provisional application No. 62/981,154, filed on Feb. 25, 2020.

(51) Int. Cl.
| | |
|---|---|
| *H04M 1/72424* | (2021.01) |
| *G09G 5/38* | (2006.01) |
| *G06F 3/04817* | (2022.01) |
| *H04N 5/76* | (2006.01) |
| *H04M 1/72469* | (2021.01) |
| *G10L 25/48* | (2013.01) |
| *G06F 3/16* | (2006.01) |

(52) U.S. Cl.
CPC .... *H04M 1/72424* (2021.01); *G06F 3/04817* (2013.01); *G06F 3/16* (2013.01); *G09G 5/38* (2013.01); *G10L 25/48* (2013.01); *H04M 1/72469* (2021.01); *H04N 5/76* (2013.01); *G09G 2354/00* (2013.01); *H04M 2201/42* (2013.01); *H04M 2242/04* (2013.01); *H04M 2250/52* (2013.01)

(58) Field of Classification Search
CPC ......... H04M 1/72424; H04M 1/72469; H04M 2201/42; H04M 2242/04; H04M 1/72536; H04M 3/567; G09G 5/38; G09G 2354/00; G06F 3/04817; G06F 3/16; H04N 5/76; H04N 7/147; G10L 25/48; H04W 4/02; G06Q 50/265
USPC ........................................ 455/404.01, 404.02
See application file for complete search history.

(56) References Cited

U.S. PATENT DOCUMENTS

| | | | |
|---|---|---|---|
| 2003/0012344 A1* | 1/2003 | Agarwal ............. | H04M 11/045 |
| | | | 379/37 |
| 2010/0262928 A1* | 10/2010 | Abbott .................. | G06F 3/0486 |
| | | | 345/173 |
| 2013/0205107 A1* | 8/2013 | Dikvall ................ | H04N 19/423 |
| | | | 711/160 |
| 2014/0368601 A1* | 12/2014 | deCharms ............. | H04N 7/147 |
| | | | 348/14.02 |

(Continued)

*Primary Examiner* — Maria El-Zoobi

(57) ABSTRACT

An audiovisual safety system is provided comprising a personal electronic device having one or more processors and a memory storing instructions. When the instructions are executed by the one or more processors, the personal electronic device may initiate audio communication between the personal electronic device and one or more emergency services. The audio communication may be initiated via a first screen interaction with an emergency contact icon at a first location on a display screen of the personal electronic device. The personal electronic device may capture audio content data and video content data associated with an emergency event, may store the audio content data and the video content data, and may maintain the audio communication between the personal electronic device and the one or more emergency services while continuing to capture the audio content data and the video content data associated with the emergency event.

15 Claims, 3 Drawing Sheets

(56) References Cited

U.S. PATENT DOCUMENTS

2019/0196707 A1* 6/2019 Szeto .................. G06F 13/4068

* cited by examiner

AUDIOVISUAL SAFETY SYSTEM

CROSS-REFERENCE TO RELATED APPLICATIONS

This application claims priority to U.S. Provisional Patent Application Ser. No. 62/981,154, entitled "Audiovisual Safety Platform," filed Feb. 25, 2020. The contents of this application are hereby incorporated by reference in their entirety.

BACKGROUND OF THE INVENTION

In today's world cell phones or smart phones are ubiquitous. With this multifunctional tool anyone can record and document any daily occurrences or capture potentially dangerous events to share on social media. Unfortunately some of these events may require emergency or non-emergency personnel. To avoid missing a significant occurrence on video, some individuals choose to continue recording video over calling for help. This could have a negative effect if the individuals do not call for help immediately. By using the system disclosed herein, an individual is able to simultaneously record desired events while calling emergency services personnel to respond to the events being recorded.

Allowing a person the ability to make a call for help while simultaneously recording video may help prevent delays in reporting potentially dangerous incidents which allows emergency responders to coordinate response quickly. This may have a positive impact on ending a dangerous situation or providing much needed medical attention. Performing both actions simultaneously also allows for potentially crucial evidence to be preserved or to corroborate witness accounts of an incident.

SUMMARY OF THE INVENTION

The present invention provides individuals with a system that, in part, allows for video recording and making a phone call simultaneously. The present invention functions as a recording and calling tool in both emergency and non-emergency situations. The present invention enables individuals to directly call various emergency services including the fire department, the police department and other public help services via the user interface. The present invention prevents incidents from going unnoticed, allowing individuals to corroborate their story with emergency service personnel. The present invention offers a discrete method of calling for assistance in dangerous situations.

The system can also be used to quickly call emergency personnel using the graphical user interface. Individuals may simultaneously record personal audio and video while placing the emergency or non-emergency call. A first colored button graphic can be actuated on the graphical user interface to record video and/or audio while a second colored button graphic can be actuated to call emergency services. Optionally, a third colored button graphic may be actuated to call non-emergency services.

Further, the audio and video may be recorded to a remote server associated with the providers of the mobile software stored on a personal electronic device in the form of a software system. Emergency service personnel may receive a live stream of the video and/or audio of the individual to determine parameters associated with the individual's emergency.

Advantageously, the audiovisual safety system may optionally include a stealth mode. An icon may be provided to allow all sound from the smartphone or tablet device to be silenced if the individual is attempting to hide while placing a call to emergency services. Additionally, the smartphone or tablet device may give an appearance that no action is being taken on the smartphone or tablet device. Alternatively, maximum volume may be utilized by the mobile software via the personal electronic device in order to sound an alarm of the ongoing emergency situation. Along with audiovisual capabilities, simultaneous location tracking may be automatically shared with emergency personnel via the personal electronic device. A timestamp may be recorded in-screen during audiovisual recording of the individual in order to further corroborate the events of the emergency situation.

The individual may initialize a call to emergency services by performing a swipe action on the red icon. In addition or as alternate to the swipe action, various additional measures may be implemented to avoid accidental calls. This may include holding the icon for a threshold amount of time, keeping a threshold pressure on the icon during a swipe, answering a confirmation dialog box to confirm a call initialization to emergency services, pressing a preset combination of external buttons on the personal electronic device, providing a preset voice command and the like or any combination thereof.

The audiovisual safety system may provide a camera icon that is individual selectable through the graphical user interface. Initializing the camera function allows the individual to record video and take photographs of an incident. Additionally, a camera switching icon may be provided to allow the individual of the audiovisual safety system to switch from using a front camera to a rear camera or from a rear camera to a front camera. An option may be provided to simultaneously record video via all available cameras on a smartphone or tablet device including a rear-facing camera, a front-facing camera and the like.

The audiovisual safety system may provide a microphone icon which may be utilized to activate recording audio. The audiovisual safety system may provide a function allowing audio and video to be recorded simultaneously while calling emergency services.

Further, the audiovisual safety system may provide a settings icon which allows the individual to open a settings menu having a number of options available to the individual to control the function and operation of some aspects of the audiovisual safety system. The setting menu may allow access to the audiovisual safety system settings including language, previous recordings, and sharing recordings with contacts or via social media. Additional options may be available to the individual through the settings menu allowing the option to customize the user interface. Settings options may include colors, themes, button layout, left-hand and right-hand settings, and a quick-dial contact list.

Further, an optional alarm mode may allow a service network to determine the location of an emergency/dangerous situation. The service network may warn other approaching individuals of the emergency/dangerous situation allowing appropriate action to be taken. Additionally, the optional alarm mode may disable the 'airplane mode' feature of a smartphone or tablet device to ensure that monitoring capabilities are active in the event of a kidnapping or theft.

The audiovisual safety system may allow individuals to form a linked group enabling communication and location sharing with other individuals of the group. Further, the audiovisual safety system may allow individuals to stream audio or video content to an online platform. The audio or video streaming may be performed in real time or delayed and streamed after a recording is finished.

Emergency service personnel may have access to their own portal and login within the audiovisual safety system to allow engaging with a user interface. Separate subscription services may be provided for emergency service personnel and end-consumer individuals.

While many features, options and use cases are enumerated herein, these are described to for illustrative purposes and do not limit the scope of this invention. Many additional features, options and use cases may be envisioned and included as would be apparent to one of ordinary skill in the art.

DETAILED DESCRIPTION OF THE INVENTION

Figure 1:
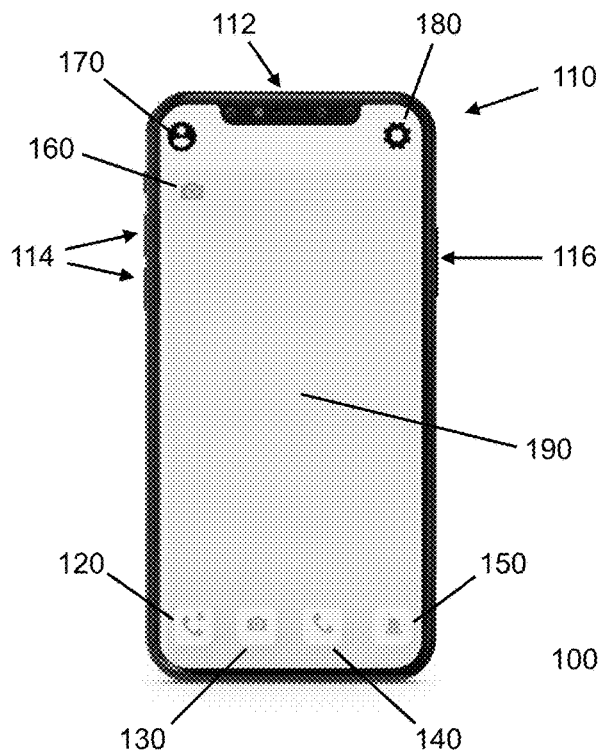
FIG. 1 depicts an overview of an audiovisual safety system implemented on a graphical user interface run on a personal electronic device in accordance with some embodiments of the present invention.

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting. As used in this specification and the appended claims, terms in the singular and the singular forms "a," "an," and "the" include plural referents unless the context clearly dictates otherwise. Thus, for example, reference to "an audiovisual safety system" also includes a plurality of audiovisual safety systems operable by different individuals, and the like.

In some embodiments, an audiovisual safety system is provided comprising a personal electronic device having one or more processors and a memory storing instructions that, when executed by the one or more processors, cause the personal electronic device to: initiate audio communication between the personal electronic device and one or more emergency services, wherein the audio communication is initiated via a first screen interaction with an emergency contact icon at a first location on a display screen of the personal electronic device; capture audio content data and video content data associated with an emergency event; store the audio content data and the video content data; and maintain the audio communication between the personal electronic device and the one or more emergency services while continuing to capture the audio content data and the video content data associated with the emergency event.

In some embodiments, the first screen interaction continues interaction with the emergency contact icon from the first location to a second location of the display screen.

In some embodiments, the emergency contact icon is positioned at the second location after the first screen interaction ceases interaction with the emergency contact icon.

In some embodiments, the emergency contact icon moves from the first location to the second location while the first screen interaction continues interaction with the emergency contact icon.

In some embodiments, the audio communication terminates via a second screen interaction with the emergency contact icon at the second location on the display screen of the personal electronic device.

In some embodiments, the second screen interaction continues interaction with the emergency contact icon from the second location to the first location of the display screen.

In some embodiments, the emergency contact icon remains at the first location after the second screen interaction ceases interaction with the emergency contact icon.

In some embodiments, capturing the audio content data and the video content data is initiated via a third screen interaction with a camera icon at a third location on the screen of the personal electronic device.

In some embodiments, the captured audio content data and the captured video content data are streamed to one or more remote computing devices operated by the one or more emergency services.

In some embodiments, the initiation of audio communication between the personal electronic device and the one or more emergency services allows third-party remote access control of the personal electronic device.

In some embodiments, allowing third-party remote access control of the personal electronic device enables one or more third-parties to execute one or more of the following actions on the personal electronic device: enabling capture of audio content data and video content data; activating a stealth mode or an alarm mode; communicating location data of the personal electronic device; preventing the personal electronic device from powering down; and powering up the personal electronic device.

In some embodiments, storing the audio content data and the video content data further comprises: prioritizing previously stored audio content data and video content data for deletion; and deleting lowest priority stored audio content data and video content data while capturing the audio content data and the video content data associated with the emergency event.

In some embodiments, an audiovisual safety system is provided comprising a personal electronic device having one or more processors and a memory storing instructions that, when executed by the one or more processors, cause the personal electronic device to: initiate audio communication between the personal electronic device and one or more emergency services, wherein the audio communication is initiated via a first screen interaction with an emergency contact icon at a first location on a display screen of the personal electronic device, wherein the first screen interaction continues interaction with the emergency contact icon from the first location to a second location of the display screen, wherein the emergency contact icon moves from the first location to the second location while the first screen interaction continues interaction with the emergency contact icon, and wherein the emergency contact icon is positioned at the second location after the first screen interaction ceases interaction with the emergency contact icon; capture audio content data and video content data associated with an emergency event; store the audio content data and the video content data; and maintain the audio communication between the personal electronic device and the one or more emergency services while continuing to capture the audio content data and the video content data associated with the emergency event.

In some embodiments, the initiation of audio communication further comprises one or more of: after the first screen interaction ceases interaction with the emergency contact icon, initiating a second screen interaction not with the emergency contact icon at a third location on the display screen of the personal electronic device; prior to the first screen interaction ceasing interaction with the emergency contact icon, maintaining the first screen interaction with the emergency contact icon at the second location for a threshold amount of time; and prior to the first screen interaction ceasing interaction with the emergency contact icon, applying a threshold amount of pressure upon the display screen at the emergency contact icon.

In some embodiments, an audiovisual safety system is provided comprising a personal electronic device having one or more processors and a memory storing instructions that, when executed by the one or more processors, cause the personal electronic device to: initiate audio communication between the personal electronic device and one or more emergency services, wherein the initiation of audio communication between the personal electronic device and the one or more emergency services allows third-party remote access control of the personal electronic device, wherein the audio communication is initiated via a first screen interaction with an emergency contact icon at a first location on a display screen of the personal electronic device, wherein the first screen interaction continues interaction with the emergency contact icon from the first location to a second location of the display screen, wherein the emergency contact icon moves from the first location to the second location while the first screen interaction continues interaction with the emergency contact icon, and wherein the emergency contact icon is positioned at the second location after the first screen interaction ceases interaction with the emergency contact icon; capture audio content data and video content data associated with an emergency event; store the audio content data and the video content data, wherein storing the audio content data and the video content data further comprises: prioritizing previously stored audio content data and video content data for deletion; and deleting lowest priority stored audio content data and video content data while capturing the audio content data and the video content data; and maintain the audio communication between the personal electronic device and the one or more emergency services while continuing to capture the audio content data and the video content data associated with the emergency event.

Exemplary embodiments of the present invention are illustrated in the accompanying figures. As shown in FIG. 1, a first exemplary embodiment of an audio visual safety system 100 includes a personal electronic device 110. The personal electronic device 110 may be a smartphone, tablet, desktop computer and the like. The personal electronic device 110 may be provided with an audiovisual safety system 100. The audiovisual safety system 100 may be implemented as a software system downloadable onto a personal electronic device 110 controlled by an individual.

The personal electronic device 110 may include one or more processors and non-transitory computer-readable medium. The non-transitory computer-readable medium may store instructions that, when executed by the one or more processors, cause the processor to initiate the audiovisual safety system 100 and perform numerous operations associated with the audiovisual safety system 100.

The personal electronic device 110 may include an outer body with a right side button 116 and two left side buttons 114. While this button configuration is depicted in FIG. 1, it is understood that other similar arrangements may be utilized. Additionally, the personal electronic device 110 may include a camera group 112 for use in recording audio and video usable within the audiovisual safety system 100. Additionally, a silencing button may be provided on the body of the personal electronic device 110.

The personal electronic device 110 includes a display screen which may include a display field 190 comprising a graphical user interface which may present additional information to the individual. Interaction may be performed through use of the right side button 116 and the left side buttons 114 and may also be performed through touch capabilities of the display screen. The display screen may be responsive to one or more screen interactions which may include, but are not limited to, capacitive touch interactions, cursor interactions, stylus interactions, mouse interactions, voice interactions and the like or any combination thereof. Further, any of these aforementioned interactions may comprise movement of the interaction in one or more directions across any portion of the display screen.

Further, the display field 190 may present graphical depiction of a plurality of icons of the audiovisual safety system 100. For example, the display field 190 may depict an emergency services icon 120 which, when selected, allows audio communication with one or more emergency services. The audiovisual safety system 100 may allow communication with an emergency service number or non-emergency service number. Specifically, any of the aforementioned screen interactions may comprise interaction with any one or more of the plurality of icons presented within the display field 190. Further, any of the aforementioned screen interactions may comprise interaction with any one or more of the plurality of icons that moves the icons across any portion of the display screen. Additionally, movement of one or more of the plurality of icons to one or more specific locations of the display screen may cause actions to be taken including, but not limited to, initiating communication between the personal electronic device 110 and one or more emergency services, termination of audio communication between the personal electronic device 110 and one or more emergency services, capturing of audio content data and video content data associated with an emergency event, storing of the audio content data and the video content data within memory of the personal electronic device 110, maintaining the audio communication between the personal electronic device 110 and the one or more emergency services while continuing to capture the audio content data and the video content data associated with the emergency event and the like or any combination thereof.

The individual may initialize a call to emergency services by performing a swipe action on the emergency services icon 120. In addition or as alternate to the swipe action, various additional measures may be implemented to avoid accidental calls. This may include contacting the icon with the individual's digit 312 for a threshold amount of time.

The threshold amount of time may be between 1-4 seconds, but is preferably between 1-3 seconds and more preferably between 1-2 seconds. Upon reaching the threshold, the icon may be activated. Further, additional individual actions may be taken to activate the icon including, but not limited to, keeping a threshold pressure on the icon, answering a confirmation dialog box and the like or any confirmation thereof.

Additionally, an icon 140 may be used to automatically dial an individual-designated emergency contact number. The individual designated emergency contact number may be assigned through use of a settings menu 180. A further additional icon (not shown) may be utilized to automatically dial the nearest non-emergency services personnel, e.g. non-emergency police or fire department numbers.

The audiovisual safety system 100 may include a camera icon 130 that is individual selectable through the graphical user interface of the display. The individual may initialize the camera function by swiping on the camera icon 130 which allows the individual to record video and take photographs of an emergency event witnessed by the individual. Once a swipe is performed the camera function will automatically begin recording video and display the video in the display field 190. An option to switch to photo mode may be selectable by the individual to take still photographs.

Additionally, the audiovisual safety system 100 may include a camera switch icon 160 that is available when the camera icon 130 is activated which allows the individual to switch from activating a rear facing camera to a front facing camera or vice versa. The audiovisual safety system 100 may include an option that is available when the camera icon 130 is activated which allows for simultaneous recording of video via all available cameras on the personal electronic device 110. Further, the audiovisual safety system 100 may include a microphone icon (not shown) allowing simultaneous audio recording of an emergency event and an emergency services call.

Further, the audiovisual safety system 100 may include a profile icon 170 which allows an individual to login to the audiovisual safety system. The audiovisual safety system 100 may additionally include a settings icon 180 presenting a number of individual-selectable settings including language selection, previous recordings access, means of sharing recordings with third parties and the like. The settings menu 180 may allow customization of the user interface including, but not limited to, colors, themes, button layout, left/right handedness control settings, a quick-dial contact list and the like. Specifically, the left/right handedness control settings allow an individual to alter the layout of the user interface based upon the handedness of the individual. For example, the aforementioned icons may appear on the right side of the user interface display when a right-handedness control setting is selected and the icons may appear on the left side of the user interface display when a left-handedness control setting is selected.

The personal electronic device 110 may include external input buttons including the right side button 116 and the left side buttons 114 and may optionally include a silent button. Through use of the settings menu in the audiovisual safety system 100 these buttons may be assigned various functions while the audiovisual safety system 100 is in use. The buttons may be assigned a simultaneous press combination or a sequence press combination to indicate activation or confirmation of an emergency call. The buttons may be assigned a sequence press combination to unlock the audiovisual safety system. The silent button may turn off audible notifications and alerts. Optionally, when an emergency services call is placed the silent button may allow for activation of a stealth mode. Alternatively, stealth mode may be activated via an icon within the user interface or by other individual input.

The audiovisual safety system 100 may optionally include a stealth mode. The individual may optionally activate stealth mode by selecting a stealth mode icon (not shown) which is utilized to mute all sound from the personal electronic device 110 and allows the individual to place a silent call to emergency services personnel. Stealth mode allows the individual to place a call without the risk of the personal electronic device 110 making a noise which may alert someone to the individual's location.

The audiovisual safety system 100 may include an alarm mode. The individual may activate alarm mode by selecting an alarm mode icon 150. When selected the alarm mode may allow the personal electronic device 110 to produce high amplitude audio and visual indicators which may aid in individual detection. Visual indicators may include activation of a personal electronic device illumination element such as a flash or flashlight feature which may be activated to its brightest setting or a strobe setting to disorient an attacker. Optionally, the flashlight may be activated to produce an intermittent series of pulses such as an SOS emergency message. Through use of the alarm mode an individual may alert other people in the area that there is a dangerous situation and help is required. Additionally, alarm mode may allow the audiovisual safety system 100 to utilize location data of the personal electronic device 110 to warn other nearby individuals of the emergency situation. The other individuals may be able to contact emergency services personnel and/or the other individuals may be able to intervene and assist in the emergency situation. Further, the alarm mode may include a function which disables the "airplane mode" feature of a personal electronic device 110. When the airplane mode is disabled the personal electronic device 110 is able to maintain connection to service provider networks and GPS location services which may aid in determining the individual location.

Figure 2:
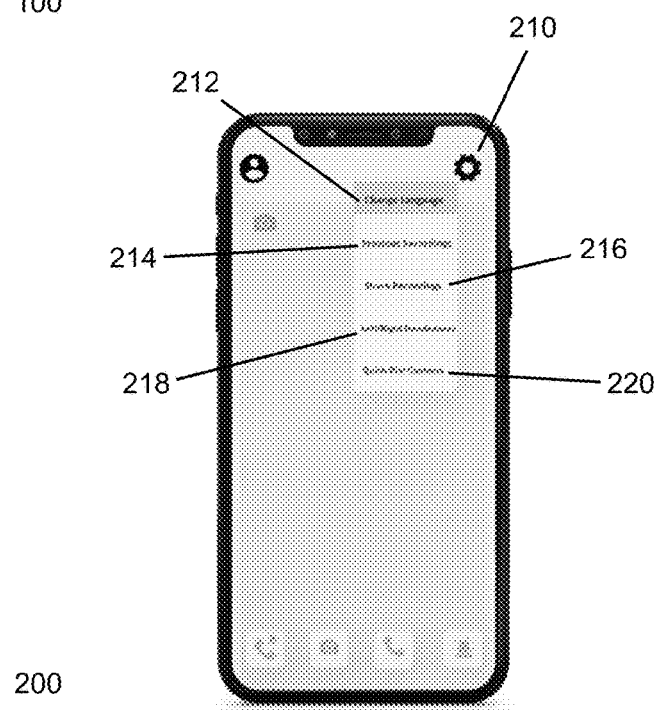
FIG. 2 depicts a plurality of settings operations of an audiovisual safety system implemented on a graphical user interface run on a personal electronic device in accordance with some embodiments of the present invention.

As shown in FIG. 2, a plurality of settings operations of an audiovisual safety system 200 implemented on a graphical user interface run on an individual personal electronic device is provided. The display of the personal electronic device may include a settings icon 210 which, when selected by an individual, present a number of options available to the individual to control the function and operation of the audiovisual safety system 200. The settings menu may include, but is not limited to, one or more of the following options: Change Language 212, Previous Recordings 214, Share Recordings 216, Left/Right Handedness 218 and Quick Dial Contacts 220.

When an individual selects Change Language 212 the individual will be presented with an additional list of available languages which may include for example, English, Spanish, French, German, Korean, Chinese and the like. Upon selection of a language the text presented in the audiovisual safety system 200 will be changed to the desired language. Similarly, the audiovisual safety system may provide translation services. For example, if the individual is calling or messaging emergency services in a foreign country, then the audiovisual safety system may automatically translate detected voice input or text input into the native language of the foreign country. The transition service may be built into the audiovisual safety system or it may be a third party translation service operating in conjunction with the audiovisual safety system.

When an individual selects Previous Recordings 214 the individual will be presented with a selection of audio and/or video recordings that were previously recorded through the audiovisual safety system 200. The recordings may be stored locally within the storage capacity of the personal electronic device and/or may be stored remotely on a server accessible by the audiovisual safety system 200.

When Share Recordings 216 is selected the individual will be presented with a log of audio and/or video recordings that were previously recorded through the audiovisual safety system 200. Each recording may be shared with a third party including, but not limited to, email contacts, social media contacts, personal contacts and the like or any combination thereof. Alternatively, an individual may select to have all recordings uploaded to a third-party to prevent a malicious actor from destroying possible incriminating evidence from an individual's personal electronic device.

When Left/Right Handedness 218 is selected the individual will be presented with an option to select the configuration of icons on the display. When the right handed setting is selected the icons will be configured in a manner that allows quick and easy access to select the important emergency icons with the use of only the right hand. When the left handed setting is selected the orientation of some or all of the icons may be transposed to a position that allows quick any easy access to select the important emergency icons with the use of only the left hand. For example, the icons of FIG. 1 may appear on the right side of the user interface display when a right-handedness control setting is selected and the icons may appear on the left side of the user interface display when a left-handedness control setting is selected.

When Quick Dial Contacts 220 is selected the individual will be presented with an option to change or input contacts for use with an emergency contact icon. The individual may input a number of contacts to be stored within the audiovisual safety system 200. The individual may select one contact to be actively designated as the emergency contact that is called when an emergency contact icon is selected. Additionally, when the emergency contact icon is selected, one or more of SMS messages, emails, social media messages and the like may be sent if provided with the emergency contact information.

The settings menu may provide additional options to customize the user interface. For example, the individual may select a variety of background colors and text colors to enhance the appearance and usability of the audiovisual safety system 200 providing options that may be easier for an individual to see based on light/color sensitivity or brightness/contrast.

With reference back to FIG. 1, the settings menu in the audiovisual safety system 100 may allow the right side button 116, the left side buttons 114 and a silent button to be assigned various functions while the audiovisual safety system 100 is in use. The buttons may be assigned a simultaneous press combination or a sequence press combination to indicate activation or confirmation of an emergency call. The buttons may be assigned a sequence press combination to unlock the audiovisual safety system. The silent button may turn off audible notifications and alerts. Optionally, when an emergency services call is placed the silent button may activate a stealth mode.

Figure 3A:
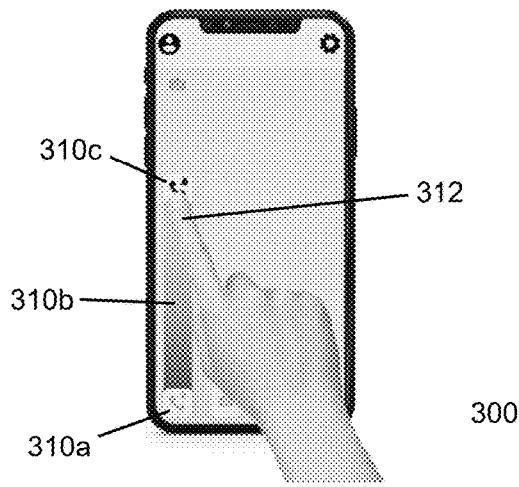
FIG. 3A depicts a first screen interaction of an audiovisual safety system implemented on a graphical user interface run on a personal electronic device in accordance with some embodiments of the present invention.

As shown in FIG. 3A, a first individual operation of an audiovisual safety system 300 implemented on a graphical user interface run on an individual personal electronic device is provided. An individual is presented with a number of icons on a display of the personal electronic device. Each icon may activate various functions including calling emergency services personnel, calling non-emergency services personnel, calling an emergency contact number, activating an alarm mode, activating a stealth mode or the like and any combination thereof.

In order to activate an icon, action must be taken by an individual. This action may be in the form of a physical swipe on a touch capable surface of the display of the personal electronic device. An icon may have an initial icon location 310a. To initiate a swiping motion the individual utilizes a digit 312 and makes contact with the icon at the initial icon location 310a. The individual maintains contact with the touch surface and moves their digit 312 in an upward motion along the display on a swipe path 310b. The individual completes the swiping motion upon reaching a final icon location 310c. The final icon location 310c may be at a distance from the initial icon location 310a greater than the distance to the halfway point of the display. Upon reaching the final icon location 310c the icon becomes activated. When the icon is activated it may remain at the final icon location 310c until a further action is taken to deactivate the icon.

This motion is depicted with a single icon in FIG. 3A but it is understood that this swipe motion may be taken with any icon disclosed. Alternatively, the icons may be activated through means other than or in addition to a swipe in order to avoid an accidental call. This may include contacting the icon with the individual's digit 312 for a threshold amount of time. The threshold amount of time may be at least 1 second, but is preferably between 1-4 seconds, more preferably between 1-3 seconds and most preferably between 1-2 seconds. Upon reaching the threshold, the icon may be activated. Further, additional individual actions may be taken to activate the icon including, but not limited to, keeping a threshold pressure on the icon, answering a confirmation dialog box and the like or any confirmation thereof. Such precautionary actions may prevent unintended actions from occurring while using the system 300. For example, the precautionary measures ensure emergency services will not be called by accidentally contacting the icon while the personal electronic device 110 is in an individual's pocket, purse, hand and the like.

Upon performing the action to activate an emergency call, the call will stay active until intentionally disabled by the individual. Special procedure may be taken to disable a call, thereby preventing the call from being accidentally ended. Often individuals accidentally press a button on the display screen of the personal electronic device and cause an unintended action to be taken. For example, an individual might accidentally end a call while under stress or while the individual is running.

Figure 3B:
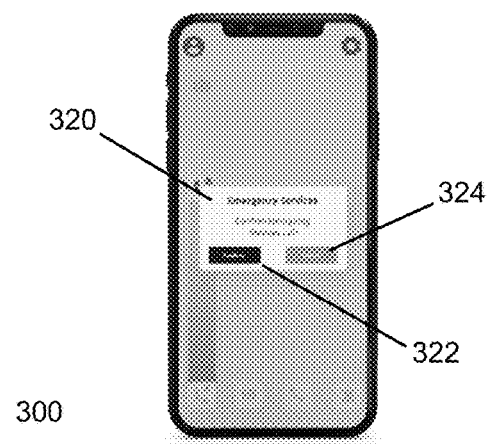
FIG. 3B depicts a second screen interaction of an audiovisual safety system implemented on a graphical user interface run on a personal electronic device in accordance with some embodiments of the present invention.

As shown in FIG. 3B, a second individual operation of an audiovisual safety system 300 implemented on a graphical user interface run on an individual personal electronic device is provided. Upon activating an icon for emergency services personnel, the individual may be shown a confirmation dialog box. As a safeguard to prevent accidental calls this dialog box 320 may be presented requiring the individual to confirm the icon activation. In order to proceed with an emergency call the individual must touch the confirm button 322. If the icon was accidentally activated the individual has the option to cancel the call by selecting the cancel button 324. In the event the cancel button is actuated, the dialog box 320 will be cleared and the icon will return to the initial icon location 310a and an emergency call will not be placed.

Figure 3C:
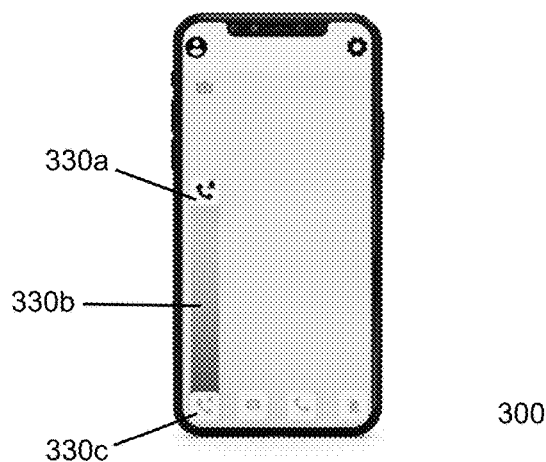
FIG. 3C depicts a third screen interaction of an audiovisual safety system implemented on a graphical user interface run on a personal electronic device in accordance with some embodiments of the present invention.

As shown in FIG. 3C, a third individual operation of an audiovisual safety system 300 implemented on a graphical user interface run on an individual personal electronic device is provided. An individual is presented with a number of icons on a display of the personal electronic device. A call to emergency services personnel may be placed using the swipe motion as described in FIG. 3A. The audiovisual safety system 300 may include protections that prevent an individual from accidentally ending an emergency call. Prematurely ending an emergency call may result in a dangerous situation for the individual if emergency services personnel are not fully notified of the emergency.

Therefore, an additional action may need to be taken by the individual in order to end the emergency call or otherwise deactivate the previously activated icon. The individual may utilize a finger to touch the display of the activated emergency icon while the emergency icon is in the activated initial position 330a. The individual performs a swipe movement across the screen along the swipe path 330b. Upon reaching a final position 330c the individual may release the finger from the screen. As the finger is released the call to emergency services personnel may be ended.

Alternatively, the icons may be deactivated through means other than or in addition to a swipe in order to avoid an accidental call. This may include contacting the icon with the individual's digit 312 for a threshold amount of time. The threshold amount of time may be between 1-4 seconds, but is preferably between 1-3 seconds and more preferably between 1-2 seconds. Upon reaching the threshold, the icon may be deactivated. Further, additional individual actions may be taken to deactivate the icon including, but not limited to, keeping a threshold pressure on the icon, answering a confirmation dialog box and the like or any confirmation thereof.

Additionally, alternative means for deactivating a call described above may be used in conjunction with the swipe action. For example, upon completion of the swipe action, a confirmation dialog box may appear presenting the individual with buttons giving an option to cancel and continue the call or to end the call. Upon pressing a button to end the call, the call to emergency services personnel may be deactivated.

Figure 4:
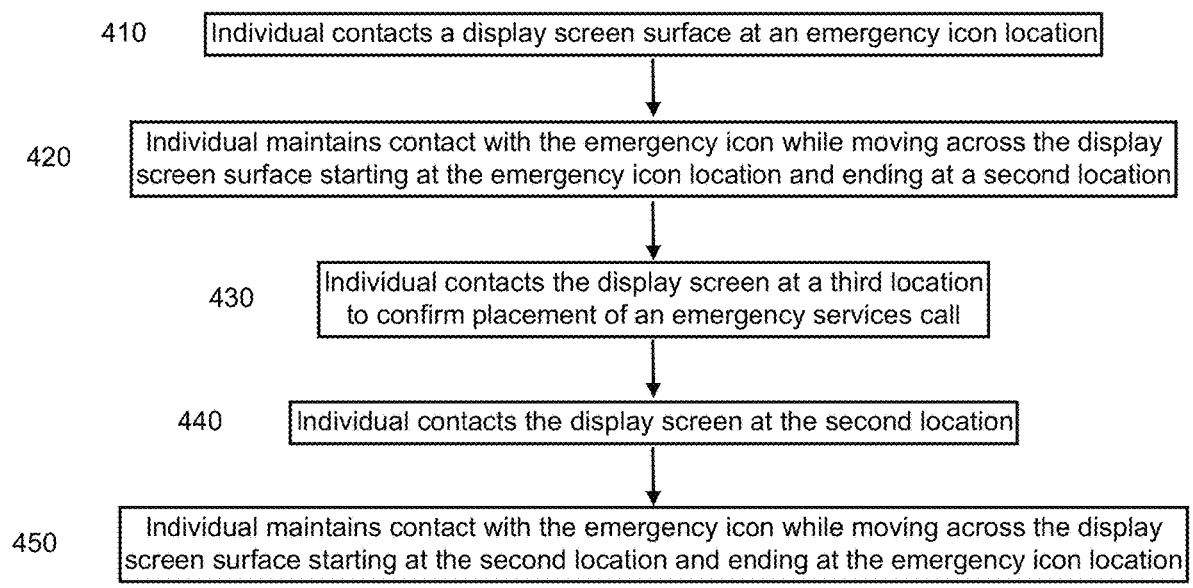
FIG. 4 depicts a method of performing a plurality of screen interactions of an audiovisual safety system implemented on a graphical user interface run on a personal electronic device in accordance with some embodiments of the present invention.

As shown in FIG. 4, a method 400 of performing a plurality of individual operations of an audiovisual safety system implemented on a graphical user interface run on an individual personal electronic device is provided. The operation of the audiovisual safety system may provide one or more functions including, but not limited to, activation of a call to emergency services within the audiovisual safety system. The operation and activation of a call may be performed by an individual digit on the touch display of a personal electronic device.

At step 410, the individual utilizes an individual digit to contact a display screen of a personal electronic device at an emergency icon location. At step 420, the individual digit maintains contact with the emergency icon at the emergency icon location. The individual may perform a swipe motion to move the icon across the display screen surface beginning at the emergency icon location and ending at a second location.

At step 430, the individual contacts the display screen at a third location to confirm the placement of an emergency services call. Contacting the display screen at a third location is provided to prevent an accidental call from being placed, for example, while the individual is running or while the personal electronic device is in the individual's pocket or purse. Other options for preventing accidental calls may be utilized as described within other embodiments.

Once the individual contacts the display screen at the third location to confirm placement of an emergency services call, then the call is activated and connected. Upon activation and connection of the call the individual may be able to perform additional operations as described within other embodiments. Additionally, emergency services personnel may be provided with location information of the personal electronic device in accordance with other embodiments.

At step 440, a call deactivation step may be initiated by the individual. An individual digit contacts the display screen at the second location. At step 450, the individual digit maintains contact with the emergency icon at the second location. The individual may perform a swipe motion to move the icon across the display screen surface beginning at the second location and ending at the emergency icon location.

Once the individual digit arrives at the emergency icon location the individual may release the digit from contact with the display screen surface. Upon release of the individual digit with the display screen surface, the call to emergency services may be deactivated. Alternatively, additional protections may be in place to prevent accidentally terminating a call in accordance with step 430 and other disclosed embodiments.

The audiovisual safety system of any of the preceding exemplary embodiments may be envisioned to alternatively include any number of additional features. These additional features may provide additional configurable features to the appearance of the audiovisual safety system or they may provide additional function and services to the audiovisual safety system. Such additional features are described herein.

Specifically, the audiovisual safety system allows operation of a camera or plurality of cameras to collect video content and a microphone to collect audio content. When video content or audio content is recorded the audiovisual safety system may provide multiple means of storing data pertaining to the content. The video and audio content may be stored locally on the personal electronic device 110 of FIG. 1. Additionally, the video and audio content may be transmitted wirelessly over a network to a cloud storage service. The cloud storage service may be operated by a provider of the audiovisual safety system or it may be operated by a third party.

Additionally, the video and audio content may be streamed over a network. Upon activating a call to emergency services personnel the individual may optionally stream live content to the emergency services personnel. This may provide the emergency services personnel more accurate information of the emergency being reported which in turn allows a faster response time by police, fire or other emergency personnel.

Further, the streamed video and audio content may be streamed to one or more third parties. Streamed content may be provided to one or more social media servers. Through the use of third party social media applications it is possible to make the streamed video and audio content available to a large audience who may or may not be present at the location of the individual. Sharing content of events ensures that the content is seen by third party witnesses and so the content may serve as evidence of wrongdoing or criminal activity.

Additionally, the audiovisual safety system has means to share location information. The location information may be from a plurality of sources. The audiovisual safety system may utilize a GPS receiver built into the personal electronic device to determine location of the personal electronic device and the individual. The audio visual safety system may utilize cellular network service provider information to determine location of the personal electronic device and the individual. The audiovisual safety system may utilize IP routing information when connected to WiFi networks to determine location of the personal electronic device and the individual. The aforementioned location determination means each have their drawbacks. For example, GPS may not provide an accurate location if surrounded by tall buildings within a city.

The audiovisual safety system may share the obtained location with emergency services personnel after a call is activated. The individual may allow the audiovisual safety system to automatically deliver the location information to the emergency services personnel when the call is initiated. Alternatively, the individual may allow the location to be shared with emergency services personnel only upon giving the audiovisual safety system permission through confirmation in a dialog box or a settings menu. Providing this additional level of confirmation allows the individual to choose to share their location or to not share their location which allows the individual to remain anonymous if desired.

It is further understood that an alternate version of the audiovisual safety system may be available to emergency services personnel having different features that are optimized for emergency services personnel. The alternate audiovisual safety system may receive calls from an individual operating the audiovisual safety system. The emergency services personnel may then view information about the individual in the connected call. The information may contain identity information of the individual and location information of the individual if the individual has allowed this information to be shared. Further, the alternate audiovisual safety system may display video content provided by the individual. Additionally, emergency services personnel may be able to remotely control the individual's personal electronic device if the individual grants such permissions. Alternatively, upon the individual initiating audio communication with the one or more emergency services, the one or more emergency services may automatically be granted remote access control of the individual's personal electronic device. For example, remote access control may enable the one or more emergency services to execute actions on the personal electronic device including, but not limited to, capturing audio content data and video content data, communicating the captured audio content data and the captured video content data to one or more remote computing devices operated by the one or more emergency services, activating a stealth mode or an alarm mode, communicating location data of the personal electronic device, preventing the personal electronic device from powering down, powering up the personal electronic device and the like or any combination thereof. Further, upon the individual initiating audio communication with the one or more emergency services, the one or more emergency services may automatically receive a stream of data to their computing devices from the personal electronic device including, but not limited to, captured audio content data, captured video content data, location data and the like or any combination thereof.

The alternate version of the audiovisual safety system may allow the emergency services personnel to dispatch a number of emergency responders including police, fire or other emergency personnel. The emergency services personnel may utilize the audiovisual safety system to provide the emergency responders with information about the emergency event including individual identity, location, video and/or audio information.

The audiovisual safety system may allow the individual an option to manage storage priority. For example, the individual may designate which data to prioritize for deletion off of the personal electronic device in the event there is no storage capacity remaining on the personal electronic device during an emergency situation. When an emergency call is placed and recording of video or audio is activated the audiovisual system will delete the data prioritized for deletion in order to store the newly recorded video or audio data. In another example, upon initiation of storing the audio content data and the video content data into memory of the personal electronic device, the software instructions stored upon the memory of the personal electronic device may cause the personal electronic device to prioritize previously stored audio content data and video content data for deletion and to delete the lowest priority stored audio content data and video content data while capturing the audio content data and the video content data associated with a presently ongoing emergency event. Prioritization may be made manually by the individual or may be automatically determined based upon the date the data was originally stored in memory on the personal electronic device. For instance, absent manual selection by the individual, the oldest data may be automatically set for deletion when additional memory space is needed to record the presently ongoing emergency event.

Alternatively, the audiovisual safety system may allow the individual to designate a third party cloud storage platform or social medial platform to send video or audio content in the event the personal electronic device does not have any storage available. Optionally, the audiovisual safety system may send the designated data to a cloud storage platform while deleting the data from the personal electronic device to provide storage space for the new video and audio recordings.

The audiovisual safety system may allow the individual to designate an additional emergency safety contact. In the event the individual places an emergency call the emergency safety contact may automatically be sent a message through email, SMS, social media or other communication mediums. Additionally, the audiovisual system may automatically place a call to the emergency safety contact. Optionally, the emergency safety contact may be provided with real-time or delayed audio or video content that is recoded by the individual during the emergency call.

The audiovisual safety system may include facial recognition capabilities via one or more of the personal electronic device cameras. A facial recognition software program may operate in conjunction with the audiovisual safety system to maintain secure access for the individual to the system on the personal electronic device. Further, the audiovisual safety system may utilize the facial recognition software as a means to prevent accidental calls or unauthorized calls once the system is unlocked. For example, the individual may be required to allow a facial recognition analysis to be performed to verify an emergency call is not an accidentally call and to verify that the call is being placed by an authorized individual of the audiovisual safety system. This facial recognition procedure may replace the confirmatory dialogue box of FIG. 3B or may be additive thereto.

The audiovisual safety system may utilize the facial recognition analysis software to perform analysis on faces captured with the camera of the personal electronic device. The facial recognition analysis software may be stored locally on the personal electronic device or remotely for access over a network. Analysis may be performed on subjects captured in the video automatically, when selected by the individual or when selected by emergency services personnel. The facial recognition analysis software may utilize one or more comparative characteristic thresholds to determine if facial recognition analysis is to be performed. The one or more thresholds may utilize image clarity, contrast, sharpness, identifiable facial features and the like or any combination thereof. When a threshold is met the facial recognition analysis software may analyze a subject's facial features and compare those features with one or more social media or law enforcement databases to obtain a match.

Upon completion of the facial recognition analysis a notification may be sent to the individual through the audiovisual safety system. If a match was achieved in the facial recognition analysis an identification of the subject may be provided to the individual. Further, if a law enforcement database is utilized and identifies a subject of interest, e.g. a person with an outstanding warrant, a notification may be sent to one or more law enforcement agencies. If no match is identified, then the individual is notified through the audiovisual safety system and is given the option to save or share an image of the subject of the facial recognition analysis.

Facial recognition analysis may allow an individual to identify a person involved in a crime without approaching the person, thereby removing the individual from a potentially dangerous encounter. Further, the individual may also share the associated image on social media which may raise awareness in the local community to aid capture of the person in question or allow people in the local community to take additional safety precautions.

The audiovisual safety system may include a means for detecting motion of the individual via GPS, accelerometers, gyroscope sensors, tilt sensors, altitude sensors, vibration sensors present and the like or any combination thereof. The motion detection may be utilized to perform an action within the audiovisual safety system upon reaching a threshold of motion detection.

Specifically, the motion detection threshold may be implemented in a number of ways. For example, if an accelerometer value surpasses a preset threshold limit, then this may be an indication that the individual is running or that the individual was involved in a car accident. Similarly, if vibration sensors detect a vibration pattern indicative of a running motion, then one or more of the precautionary procedures described in reference to FIG. 3B may be activated to avoid accidental or unauthorized emergency calls.

If a motion detection threshold is reached the audiovisual safety system may initiate an action. For example, the audiovisual safety system may display a message requesting confirmation of a threshold event which may indicate an emergency. The individual may indicate the existence of an emergency by selecting the appropriate response. The audiovisual safety system may include an audio or visual response to indicate a threshold has been met and individual response is requested. The individual may respond by touching the display or a physical button on the personal electronic device screen to confirm the threshold event.

Alternatively, in the event the individual is running or otherwise not able to use the personal electronic device screen, a voice response may be accepted. If the individual indicates an emergency via voice response, then the audiovisual safety system may initiate a call to emergency services personnel via an audio speaker function of the personal electronic device.

The audiovisual safety system may additionally contain a location sharing feature. The individual may allow their location to be shared in full or part with the public when the audiovisual safety system is in use. Sharing location information may allow individuals of the audiovisual safety system to find one another in an unfamiliar location or during an emergency situation.

Further, the location sharing feature may be utilized by a parent to locate a missing child who also has a personal electronic device with the audiovisual safety system. It is envisioned this may be performed while the parent and child are in a public space and become separated. The parent may simply view the child's location on the system. Additionally, the parent may send an alert to the child indicating to the child that they should return or stop.

It is further envisioned that the location sharing feature of the audiovisual safety system may be utilized in an emergency situation such as a kidnapping or abduction. In the event a parent of a child suspects a kidnapping has occurred, location information of the child may be indicated on the parent's personal electronic device through the audiovisual safety system. The parent may additionally activate an emergency alert mode which allows emergency services personnel to be called and location, audio, video etc. information of the child's personal electronic device to be shared. The audiovisual safety system may allow the parent to issue an alert to other individuals in the area of a possible abduction or kidnapping and include information about the child who missing, thus allowing individuals in an associated local community to be aware of the missing child and perpetrator.

The audiovisual safety system may include a voice command feature. The voice command feature may be activated by selecting a voice command mode where voice commands are only usable while voice command mode is active. Alternatively, voice command may be a function that is constantly active and responsive to voice commands. The voice commands may be preset commands activated by any person. The voice commands may be individual defined commands with functions assigned by the individual for specific command words. The voice commands may only be active after an individual definable alert word is detected. The voice commands may be unique to an individual and actionable by the audiovisual safety system only if the individual's unique voice is detected giving the voice command. The voice commands may be used to perform a number of functions of the audiovisual safety system including call, emergency call, hang up, take picture, record video, send picture/video and the like. Further, the unique individual voice command may be used to activate a stealth mode or other emergency mode.

The audiovisual safety system may include a means to activate a false screen. The false screen may be in the form of a black screen giving the appearance the phone is not in use. The false screen may have the appearance of a home screen or a lock screen without showing an active audiovisual safety system. Utilizing the false screen allows the individual to maintain the functions of the audiovisual safety system including emergency calls or location tracking without alerting others that emergency services has been contacted. This function may be useful in a dangerous situation including a robbery or abduction.

The false screen activation may be included as part of stealth mode or it may be activated separately from stealth mode. The individual may predefine a button combination or voice command that would activate the false screen without indication that it is active. Deactivation of the false screen may be may though a voice command, a button combination or by opening the audiovisual safety system.

The audiovisual safety system may include an emergency alert function. In the event an individual of the audiovisual safety system activates an emergency notification on their personal electronic device, the audiovisual safety system may alert other individuals in the area of a possible emergency. If the individual who identified the emergency indicates the type of emergency, then this information may be relayed to other individuals in the area thus allowing the other individuals to take preventative actions or, if needed, provide assistance.

In the event a shooting is indicated, the other individuals may be warned to take cover out of sight or leave the area altogether. In the event a robbery is indicated, the other individuals may be advised of a possible description of a suspect and advised to keep distance from anyone matching the description. It is also envisioned that the other individuals may have an option to indicate that they are a witness to the event and are willing to provide information to law enforcement.

If the emergency alert function is activated, then an individual may receive notification by a number of means. The audiovisual safety system may initiate an audible alarm and provide an alert message visible on the screen of the personal electronic device. If in silent mode the audiovisual safety system may initiate a vibrating alert. If in stealth mode the audiovisual safety system may only initiate a message presented to the individual on the personal electronic device.

The audiovisual safety system may provide functionality allowing emergency services personnel to override a function of the individual's audiovisual safety system. The override function may be provided as a safety measure in the event the emergency services personnel believes the individual may be in danger and may not be able to continue to use the audiovisual safety system. If another person causing a dangerous situation for the individual is familiar with the audiovisual safety system or is able to see an emergency call has been placed, the person may attempt to end the call or disable the audiovisual safety system. If an emergency services personnel suspects this is occurring or suspects the individual is acting under duress the emergency services personnel may activate features of the individual audiovisual safety system remotely. The emergency services personnel may override any disable features of the system and may activate other features of the system.

The emergency services personnel may remotely restart the audiovisual safety system if a person exited out of the system or they may override a mute function to allow the emergency services personnel to hear audio around the individual. If the emergency services personnel believes a significant threat is occurring they may activate stealth mode to ensure the individual is able to indicate the need for help and for the emergency services personnel to provide more detailed information about the emergency situation to the emergency responders.

The audiovisual safety system may include the ability to link groups of individuals in the system. These groups may be family, friends, workplaces, tour groups and the like. The ability to link groups may allow individuals to share location information with the other linked individuals. The individuals may also be able to share video and pictures within the group and send messages to other group members privately or broadcasted to the entire group.

In the event an individual encounters an emergency situation, an alert may be activated. All other members of the group may be alerted to the emergency situation through the audiovisual safety system and advised of an action to take. The individuals may be advised to shelter from dangerous weather, to hide from a dangerous situation, to flee the area, to locate other individuals and gather at a specified location and the like or any combination thereof. This feature may also be useful to parents with children who may wander off and get lost allowing the parent to see the child's location and send a message to the child.

The ability to link groups of individuals may provide additional functions to the audiovisual safety system. The individuals may have the ability to use remote access to override functions on another individual's personal electronic device. If an individual suspected another individual of being in a dangerous situation and no response was given by the other individual, then various features of the audiovisual safety system may be activated including location tracking, audio or video recording, stealth or alert mode activation, audiovisual safety system reactivation and the like or any combination thereof.

This function is useful for families and would require remote access permissions to be given when joining the group. If remote access permission is not given, then no other individual may be able to remotely access another individual's personal electronic device. A single individual or multiple individuals may be assigned control permissions giving only those individuals the ability to access remote features of other individuals in the group. Further, if another unknown individual who was not on an invite list requests to join the group a notification may be sent to an individual who initiated the group. The individual who initiated the group may be presented with identifying information of the unknown individual. The individual who initiated the group may allow or deny access to the unknown individual to join the group. Further, the unknown individual may be added to a block list to prevent the unknown individual from requesting to join the group again.

The audiovisual safety system may provide means of protecting against unauthorized access. The audiovisual safety system may require a form of secure verification before granting access to an individual. This secure verification may include a password, code word, biometric identification or other form of secure verification. Once verification has been completed the individual is granted access to the audiovisual safety system. Additionally, an email or SMS may be sent to a preselected email address or number to provide notification that the audiovisual safety system was accessed. If an incorrect code or password is entered a threshold number of times, then the audiovisual safety system may block all access for a set amount of time. The set amount of time may be 1 hour, 6 hours, 24 hours or some other similar predefined length of time.

The audiovisual safety system additionally may include protections against remote unauthorized access. The audiovisual safety system may include a means of determining if an unauthorized remote access attempt is occurring through use of a number of hacking means. In the event an unauthorized access attempt is detected, a notification may be sent to the individual of the audiovisual safety system informing the individual of the remote unauthorized access attempt. The individual may be prompted to change their password, contact an audiovisual safety system representative, or lock all access to the individuals audiovisual safety system until safeguards may be put in place to prevent the remote unauthorized access.

The audiovisual safety system may include wireless connectivity function. This may include wireless connectivity through Bluetooth®. This may allow the individual to connect wireless headphones to be used with the audiovisual safety system. Additional devices with wireless connectivity may be connected to the personal electronic device and provide additional functionality to the audiovisual safety system.

While the present disclosure of the audiovisual safety system is given toward use during emergency situations, functions of the audiovisual safety system may be used while no emergency situation is present. The audiovisual safety system may be used to may regular non-emergency phone calls and may access the individual's contacts stored on the personal electronic device. Certain features such as image/video sharing may be available. Additionally, audio recoding may be available when on a normal call to allow recording of the call audio.

In addition to accessing an individual's contact list on the personal electronic device the audiovisual safety system may access additional contact lists through the individual's social media accounts or email accounts. These contacts may optionally be used when sharing audio, video or location information. Additionally, the audiovisual safety system may allow the individual to create and additional contact list within the system for emergency contacts, frequently contacted people or a contact list of other individuals of the audiovisual safety system. The contact lists would allow quick and easy access to various people the interact with in different ways within the audiovisual safety system.

Further, many use cases for the audiovisual safety system can be envisioned. Generally, any time a conflict is encountered, the ensuing encounter should ideally be recorded and preserved for purposes of evidence if criminal activity occurs. Specifically, if erratic driving, armed conflict, physical altercations or the like are observed, then it is in the public interest to preserve a record of such activity so that the activity may be properly prosecuted in a court of law. Further, recording such events will allow emergency services responders to more quickly respond to the scene of the events.

The specification and drawings are to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:
1. An audiovisual safety system, comprising:
   a personal electronic device having one or more processors and a memory storing instructions that, when executed by the one or more processors, cause the personal electronic device to:

initiate audio communication between the personal electronic device and one or more emergency services, wherein:
the audio communication is initiated via a first screen interaction with an emergency contact icon at a first location on a display screen of the personal electronic device,
the first screen interaction continues interaction with the emergency contact icon from the first location to a second location of the display screen,
thereafter, the audio communication initiation is confirmed via a second screen interaction with a confirmation indication element at a third location on the display screen different from the first and second locations, and
thereafter, the audio communication is terminated via a third screen interaction with the emergency contact icon at the second location, wherein the third screen interaction continues interaction with the emergency contact icon from the second location to the first location of the display screen;
capture audio content data and video content data associated with an emergency event;
store the audio content data and the video content data; and
maintain the audio communication between the personal electronic device and the one or more emergency services while continuing to capture the audio content data and the video content data associated with the emergency event.

2. The audiovisual safety system of claim 1, wherein the emergency contact icon is positioned at the second location after the first screen interaction ceases interaction with the emergency contact icon.

3. The audiovisual safety system of claim 1, wherein the emergency contact icon moves from the first location to the second location while the first screen interaction continues interaction with the emergency contact icon.

4. The audiovisual safety system of claim 1, wherein the emergency contact icon remains at the first location after the third screen interaction ceases interaction with the emergency contact icon.

5. The audiovisual safety system of claim 1, wherein capturing the audio content data and the video content data is initiated via a fourth screen interaction with a camera icon at a fourth location on the screen of the personal electronic device.

6. The audiovisual safety system of claim 1, wherein the captured audio content data and the captured video content data are streamed to one or more remote computing devices operated by the one or more emergency services.

7. The audiovisual safety system of claim 1, wherein the initiation of audio communication between the personal electronic device and the one or more emergency services allows third-party remote access control of the personal electronic device.

8. The audiovisual safety system of claim 7, wherein allowing third-party remote access control of the personal electronic device enables one or more third-parties to execute one or more of the following actions on the personal electronic device:
capturing audio content data and video content data;
communicating the captured audio content data and the captured video content data to one or more remote computing devices operated by the one or more emergency services;
activating a stealth mode or an alarm mode;
communicating location data of the personal electronic device;
preventing the personal electronic device from powering down; and
powering up the personal electronic device.

9. The audiovisual safety system of claim 1, wherein storing the audio content data and the video content data further comprises:
prioritizing previously stored audio content data and video content data for deletion; and
deleting lowest priority stored audio content data and video content data while capturing the audio content data and the video content data associated with the emergency event.

10. An audiovisual safety system, comprising:
a personal electronic device having one or more processors and a memory storing instructions that, when executed by the one or more processors, cause the personal electronic device to:
initiate audio communication between the personal electronic device and one or more emergency services, wherein:
the audio communication is initiated via a first screen interaction with an emergency contact icon at a first location on a display screen of the personal electronic device,
the first screen interaction continues interaction with the emergency contact icon from the first location to a second location of the display screen,
the emergency contact icon moves from the first location to the second location while the first screen interaction continues interaction with the emergency contact icon,
the emergency contact icon is positioned at the second location after the first screen interaction ceases interaction with the emergency contact icon,
thereafter, the audio communication initiation is confirmed via a second screen interaction with a confirmation indication element at a third location on the display screen different from the first and second locations, and
thereafter, the audio communication is terminated via a third screen interaction with the emergency contact icon at the second location, wherein the third screen interaction continues interaction with the emergency contact icon from the second location to the first location of the display screen;
capture audio content data and video content data associated with an emergency event;
store the audio content data and the video content data; and
maintain the audio communication between the personal electronic device and the one or more emergency services while continuing to capture the audio content data and the video content data associated with the emergency event.

11. The audiovisual safety system of claim 10, wherein the initiation of audio communication further comprises one or more of:
after the first screen interaction ceases interaction with the emergency contact icon, initiating a second screen interaction not with the emergency contact icon at a third location on the display screen of the personal electronic device;
prior to the first screen interaction ceasing interaction with the emergency contact icon, maintaining the first screen interaction with the emergency contact icon at the second location for a threshold amount of time; and prior to the first screen interaction ceasing interaction with the emergency contact icon, applying a threshold amount of pressure upon the display screen at the emergency contact icon.

12. The audiovisual safety system of claim 10, wherein the emergency contact icon remains at the first location after the third screen interaction ceases interaction with the emergency contact icon.

13. The audiovisual safety system of claim 10, wherein the initiation of audio communication between the personal electronic device and the one or more emergency services allows third-party remote access control of the personal electronic device, and wherein allowing third-party remote access control of the personal electronic device enables one or more third-parties to execute one or more of the following actions on the personal electronic device:

capturing audio content data and video content data;

communicating the captured audio content data and the captured video content data to one or more remote computing devices operated by the one or more emergency services;

activating a stealth mode or an alarm mode;

communicating location data of the personal electronic device;

preventing the personal electronic device from powering down; and powering up the personal electronic device.

14. The audiovisual safety system of claim 10, wherein storing the audio content data and the video content data further comprises:

prioritizing previously stored audio content data and video content data for deletion; and deleting lowest priority stored audio content data and video content data while capturing the audio content data and the video content data associated with the emergency event.

15. An audiovisual safety system, comprising:

a personal electronic device having one or more processors and a memory storing instructions that, when executed by the one or more processors, cause the personal electronic device to:

initiate audio communication between the personal electronic device and one or more emergency services, wherein:

the initiation of audio communication between the personal electronic device and the one or more emergency services allows third-party remote access control of the personal electronic device, the audio communication is initiated via a first screen interaction with an emergency contact icon at a first location on a display screen of the personal electronic device, the first screen interaction continues interaction with the emergency contact icon from the first location to a second location of the display screen, the emergency contact icon moves from the first location to the second location while the first screen interaction continues interaction with the emergency contact icon, the emergency contact icon is positioned at the second location after the first screen interaction ceases interaction with the emergency contact icon, thereafter, the audio communication initiation is confirmed via a second screen interaction with a confirmation indication element at a third location on the display screen different from the first and second locations, and thereafter, the audio communication is terminated via a third screen interaction with the emergency contact icon at the second location, wherein the third screen interaction continues interaction with the emergency contact icon from the second location to the first location of the display screen;

capture audio content data and video content data associated with an emergency event;

store the audio content data and the video content data, wherein storing the audio content data and the video content data further comprises:

prioritizing previously stored audio content data and video content data for deletion; and deleting lowest priority stored audio content data and video content data while capturing the audio content data and the video content data; and maintain the audio communication between the personal electronic device and the one or more emergency services while continuing to capture the audio content data and the video content data associated with the emergency event.

* * * * *